United States Patent [19]

Posso, deceased et al.

[11] 3,794,258

[45] Feb. 26, 1974

[54] REEL FOR USE WITH FLEXIBLE STRIPS

[76] Inventors: Pierre Ludovic Andre Posso, deceased, late of Lausanne, Switzerland; Patrick Pierre Posso, 10 Avenue Jurigoz, Lausanne, Switzerland

[22] Filed: July 25, 1972

[21] Appl. No.: 275,055

[52] U.S. Cl. .................................. 242/71.8, 242/116

[51] Int. Cl. ............................................ B65h 75/18

[58] Field of Search .... 242/71.8, 71.8 A, 71.9, 116, 242/118.4, 118.8

[56] References Cited

UNITED STATES PATENTS

| | | | |
|---|---|---|---|
| 3,208,688 | 9/1965 | Hones | 242/74.2 |
| 3,184,178 | 5/1965 | Budge | 242/71.8 A |
| 3,642,223 | 2/1972 | Feichtinger | 242/71.8 |
| 3,143,313 | 8/1964 | Purzycki | 242/71.8 A |

*Primary Examiner*—John W. Huckert
*Assistant Examiner*—Edward J. McCarthy
*Attorney, Agent, or Firm*—Brooks Haidt & Haffner

[57] ABSTRACT

A reel for use with flexible strips, for example magnetic tape, assembled from two separate parts, one of the parts, which is made from a glass fiber reinforced plastics material, comprising a side piece from which a core, including a central boss, a wind-on sleeve and a tie piece, extends transversely and the other part, which is made from a transparent plastics material, having transverse projecting members which cooperate with the core to center the other part, there being a small clearance between the centering members and the core and the parts being held together by a bonding agent which remains pliable after polymerization.

7 Claims, 2 Drawing Figures

REEL FOR USE WITH FLEXIBLE STRIPS

The present invention relates to a reel for use with flexible strips, for example magnetic tape and moving-picture film, which, while effectively protecting the strips, allows them to be stored and to be fed off precisely and at speed.

Reels for use with magnetic tape for computers are required to satisfy several conditions including the following.

The outside contact surface of the boss which takes the center turn of the tape and the inside contact surface which ensures the connection of the tape with the head of the computer must be attached to one another with absolute solidarity.

The geometrical exactness of the contact surfaces of the boss must be perfect (irregularities being less than a micron).

The outside contact surface of the boss must be extremely strong in order to bear the tensile stress which is generated in the tape when the latter is re-wound without being deformed.

The co-efficient of expansion of contraction of the outside contact surface when affected by a variation in temperature, must be as small as possible; in fact, if an excessive expansion occurs the turns of the tape are squeezed tightly together and the magnetic layer may become detached; if, on the other hand, a contraction occurs the central turns become wavy and, as a result of the relative sliding of the latter, of which there is a risk, premature wear of the tape and a deterioration in its magnetic characteristics and therefore of the information stored, can occur. For instance, if the diameter of the outside contact surface of the boss is 90 mm and if this boss is of plastics material with a normal coefficient of expansion, the variation in diameter is 130 microns for a temperature difference of 20°C, whereas it is reduced to 40 microns if the boss is of aluminium alloy or of acrylonitrile styrene reinforced with a high percentage of glass fiber, which shows the importance of this factor, bearing in mind that the thickness of a magnetic tape may be 7 to 8 microns.

The side-pieces of the reel must be solid, that is to say free of openings, to protect the tape against any damage from handling or from contact, and also to protect it against external factors (dust, atmospheric agents . . . ) in the most wide-spread case where the sealing is effected not by an external conditioning packaging case, but by a removable peripheral band surrounding the side pieces; furthermore, one of the latter must be transparent to allow the wound-on diameter of the tape to be checked.

A first type of known reel comprises two sections in moulded plastics material, such as ordinary polystyrene; these parts are formed by two side-pieces one of which is firmly attached to a winding-on boss while the other is firmly attached, on the one hand, to a centering boss fitting into the former and, on the other hand to a drive boss pressing against a stop in the first mentioned side-piece. Such a reel is advantageous from the point of view of its cost, but it has numerous drawbacks among which are inadequate strength and geometrical exactitude as well as far too high a coefficient of expansion (three times greater than that of aluminum).

A second type of known reel comprises three metal-plastic parts. A first part is formed by an aluminum core having an inside contact surface and an outside contact surface; the two other parts are plastic side-pieces each equipped with a wind on boss, these bosses fitting into one another and over the outside contact surface of the core, their firm mutual attachment being achieved by bonding. Such a reel has two important advantages: very good resistance to compression and a relatively small coefficient of expansion; however, it has the drawback of being costly, of the wind-on boss requiring re-machining to achieve the required geometrical exactness and of being unsafe and unreliable since it is always possible that the three parts will become detached particularly if the bonding is defective or ages in adverse conditions.

A third type of known reel differs from the second by the fact that the inside and outside contact-surfaces of the aluminium core remain visible and that the side pieces are shaped to fit on the body of the core joining these contact surfaces and are attached to this body by rivetting, screwing or crimping or by passing other members through it. Such a reel has the same advantages as before; in addition its geometrical exactness is improved and the risk of coming apart is eliminated: however, it has the drawback of being even more expensive.

A fourth type of known reel similar to the two preceding ones differ from them only in the nature of the core. In fact, the latter is made of an acrylonitrile styrene which is reinforced to a high degree with glass fiber. Such a reel has the same advantages since the coefficient of expansion is substantially the same as that of aluminium and its strength is adequate. Although machining is eliminated, it still remains too expensive.

An object of the present invention is to bring together, in the same reel, all the above mentioned advantages of the known reels which satisfy the essential conditions for use set out above while avoiding the disadvantages which each of them possesses. At the same time the present invention aims to reduce to a considerable degree the costs of the reel so that it only represents a reasonable part of the total selling price of packaged magnetic tapes, when the cost of unpackaged tape is, at the moment, tending to fall considerably on the market; it achieves this by reducing the number of different parts and moulds required, as well as the time taken for their manufacture and assembly, by simplifying the moulds and the way of using them, by using the least expensive materials which are suitable and by selecting shapes which involve the minimum consumption of material for the same result.

According to the invention, a reel comprises only two parts, namely a first part made in one piece of plastics material reinforced with glass-fiber, which is constituted by a first side-piece, a sleeve and a boss and a molded annular tie-piece connecting the boss rigidly to the sleeve and including sockets which are open laterally, and a second part which is made of a transparent plastics material and which is constituted by a second side-piece and has, as an internal projection, fixed centering members which project internally and engage with the sockets while being spaced away from the sleeve with a slight clearance, the connection between the centering members and the sleeve being determined by means of a bonding agent which remains pliable after polymerisation.

In a preferred embodiment of the invention the annular tie-piece has a Y-shaped cross-section with the foot of the Y attached to the boss or central part of the core and the arms, which are connected together, diverging on to the sleeve to which they are firmly fixed over its whole width, the arms having, as a projection, at the side of the relevant side-piece, equiangular protrusions enclosing the sockets mentioned above; the centering members are formed, for preference, by thin flexible fingers; in addition, the transparent side-piece also has, as an internal projection, a centering member working in conjunction with the core, this centering member formed by at least a flange portion inserted with a slight clearance over this core and connected to the latter by means of at least a bonding agent which remains pliable after polymerisation; one at least of the centering members mentioned above on one part is equipped with fine liners intended to come into contact with the cooperating surfaces of the other part and to be ultrasonically welded in a relatively easily broken manner, to ensure the temporary cohesion of the two parts at least during the polymerisation of the bonding agent.

Various other characteristics and advantages of the invention also appear from the detailed description which follows:

An embodiment of the invention will now be described, by way of non-limiting example, with reference to the accompanying drawing in which.

Figure 1:
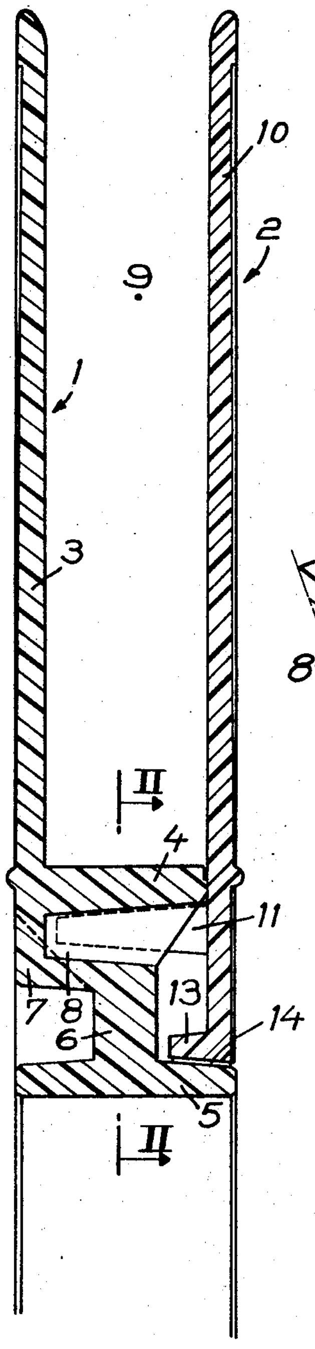
FIG. 1 is a partial axial section of a reel.

As the drawing shows, the reel is assembled from only two parts 1 and 2.

The part 1 is made of acrylonitril styrene filled, to a high degree, with glass fiber with a low coefficient of expansion, in effect, it forms the stronger of the two parts, is all in one piece is geometrically exact and stable and has dimensions which are practically invariable with variations in temperature.

It has a solid side-piece 3 which is integral, on the inside, with a wind-on sleeve 4 whose outer cylindrical face is sufficiently smooth and true to serve for winding on a magnetic tape, without re-machining. The sleeve 4 is connected to a boss 5 by an annular, moulded tie-piece 6. The inside cylindrical face of the sleeve is itself sufficiently smooth and true to serve for centering and for driving the reel by a computer head.

In the example shown, as is clearly seen from FIG. 1, the tie-piece 6 is of Y-shaped cross-section with the foot of the Y forming an annular body integral with the boss 5, which constitutes the central part of the core. The diverging arms of this tie-piece 6 are connected together so that there is no gap between them and they are thus integral with the sleeve 4 over its whole width. Thus the sleeve, the tie-piece and the boss form a core which is a completely rigid assembly and by which means the drive torque is transmitted completely and without slip to tape wound on the sleeve 4 the cylindrical wind-on surface of the sleeve being completely concentric with a computer head.

The diverging arms of the tie-piece 6 have under the sleeve 4 and towards the outside, protrusions 7 which are spaced out equiangularly and which project therefrom. These protrusions form, in conjunction with the arms of the tie-piece sockets 8 which open on the side opposite to that on which the said protrusions project.

The part 2 is made of a transparent styrene and does not share the properties defined above of part 1, nor even affect them in any way whatever. It is simply intended to enclose the annular housing space for winding on the magnetic tape and to allow the outside diameter of the latter to be seen.

It comprises a solid side-piece 10 having, as an internal projection, centering members which are termed inert, in the sense that they have no expansion or contraction effect on the sleeve 4, even though the coefficient of expansion of the part 2 is about three times as great as that of the part 1.

These centering members are advantageously formed by thin flexible fingers 11 which are normally engaged with the sockets 8 and the part 1 and which are spaced away from the sleeve 4 with a small clearance 12, the connection being ensured by means of a bonding agent which remains pliable after polymerization. In the example, described, this agent is formed by a mixture of an acrylic cement with a small proportion of butadiene.

Figure 2:
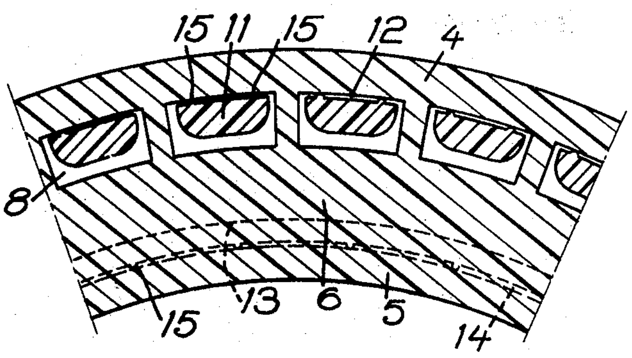
FIG. 2 is a partial cross-section along the line II—II of FIG. 1.

The transparent side piece 10 also has, as an internal projection, a centering member 13 working in conjunction with the outside surface of the boss 5, on the opposite side from the protrusions 7. This centering member 13 may advantageously be formed by a continuous (FIG. 2), or discontinuous, flange, fitting with a slight clearance 14 from the part of the boss 5 mentioned above, the connection being ensured by the same bonding agent as before.

Given the existence of clearances 12 and 14 the relative positioning of parts 1 and 2 could be inexact; furthermore, when this bonding agent is polymerised, it is important that there be no relative movement between the parts 1 and 2.

To this end, one at least of the centering members 11 and 13 is equipped with fine liners intended to come into contact with the internal surface of the sleeve 4 and/or the outside surface of the boss 5.

For preference, these liners are present on all of the centering members and are produced as fine ribs 15. As soon as the bonding agent is spread on the surface to be connected the part 2 is inserted into the part 1; centering is thus correctly performed and it is merely necessary to apply ultrasonics to join the two parts together temporarily, i.e., during polymerisation, so that handling is possible without waiting for the assembly of the reel to be finished; moreover, this attachment is deliberately made easily breakable, for the sole purpose of enabling the centering members 11 and 13 to be free to move again as soon as a variation in temperature occurs; in effect, in these conditions, the ribs are broken and consequently do not transmit the variations in size of part 2 to part 1.

The reel which is the subject of the invention may be used in all cases where the flexible strip which is stored must not be subjected to any stress on the part of the reel other than that of resulting from being driven, nor to any variation in size or positioning.

A particularly interesting application is the storage of a thin magnetic tape for a computer.

I claim:

1. A reel for use with flexible strips, for example magnetic tape, which is assembled from first and second parts, the first part being made from a plastic material reinforced with glass fibers and including a first side piece and a core, the core having a wind-on sleeve, a central drive boss, and a tie-piece connecting together the sleeve and the boss, and the tie-piece defining a plurality of sockets and the second part being made from a transparent plastics material and including a second side piece and having inert centering members projecting transversly thereof and arranged to engage in respective ones of the sockets with a clearance from the wind-on sleeve, the connection between the centering members and the sleeve being made by a bonding agent which remains pliable after polymerization.

2. A reel according to claim 1 wherein the inert centering members include thin flexible members.

3. A reel according to claim 1 including a second centering member projecting transversely from the second part and arranged to cooperate with the boss of the first part, the second centering member being spaced from the boss by a clearance, a connection between the second centering member and the boss being made by a bonding agent which remains pliable after polymerization.

4. A reel according to claim 3 including liners on at least one of the first and second centering members arranged to contact the coöperating surface of the other part whereby they can be ultrasonically welded thereto in such a way that the connection can easily be broken, in order to ensure temporary cohesion of the two parts at least during the polymerization of the bonding agent.

5. A reel accroding to claim 1 wherein the plastics material of the first part is acrylonitrile styrene, filled, to a high degree, with glass fibres having a low coefficient of expansion.

6. A reel according to claim 4 wherein the bonding agent is a mixture of an acrylic cement and butadiene.

7. A reel according to claim 1, wherein the annular tie-piece has a cross-section which is narrower at the end thereof adjoining said boss than the opposite end thereof adjoining said sleeve, the cross-section tapering down from the width thereof at said opposite end to the width of said narrower end at a point spaced from said narrower end, and said narrower end being integral with said central boss of the core and said wider opposite end being integral with said sleeve along the whole width of the latter, said tie-piece having spaced protrusions projecting therefrom at the side thereof opposite from said second part and at the sides of said sockets and defining the sides of said sockets.

* * * * *